United States Patent
Galati et al.

(10) Patent No.: US 8,282,388 B2
(45) Date of Patent: *Oct. 9, 2012

(54) APPARATUS FOR COUPLING AND UNCOUPLING AN INJECTION VALVE PIN

(75) Inventors: Vito Galati, Rowley, MA (US); Paul Joseph Savoie, Nashua, NH (US); Albert R. Bernier, Gloucester, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,892

(22) Filed: Sep. 19, 2011

(65) Prior Publication Data
US 2012/0045536 A1 Feb. 23, 2012

Related U.S. Application Data

(63) Continuation of application No. 12/775,092, filed on May 6, 2010, now Pat. No. 8,091,202, which is a continuation-in-part of application No. 12/436,458, filed on May 6, 2009, now abandoned.

(51) Int. Cl.
*B29C 45/23* (2006.01)
(52) U.S. Cl. ......................... 425/564; 425/566
(58) Field of Classification Search ................... 425/564, 425/566
See application file for complete search history.

(56) References Cited

U.S. PATENT DOCUMENTS

| | | |
|---|---|---|
| 1,791,080 A | 2/1931 | Virgil E. Yeager |
| 3,024,498 A | 3/1962 | Paul H. Bronnenkant et al. |
| 4,173,448 A | 11/1979 | Rees et al. |
| 4,279,582 A | 7/1981 | Osuna-Diaz |
| 4,389,002 A | 6/1983 | Devellian et al. |
| 4,468,191 A | 8/1984 | Gellert |
| 4,500,279 A | 2/1985 | Devellian et al. |
| 4,521,177 A | 6/1985 | Blank et al. |
| 4,521,179 A | 6/1985 | Gellert |
| 4,698,013 A | 10/1987 | Butcher |
| 4,705,473 A | 11/1987 | Schmidt |
| 4,790,236 A | 12/1988 | Macdonald et al. |
| 5,160,746 A | 11/1992 | Dodge, II et al. |
| 5,375,944 A | 12/1994 | Kotani et al. |
| 5,492,467 A | 2/1996 | Hume et al. |

(Continued)

FOREIGN PATENT DOCUMENTS
DE  3336203 A1  4/1985
(Continued)

OTHER PUBLICATIONS

"Kona HYD-4 Valve Gate Actuator", DWG No. 47-18-101, Rev. 3, 1 page.

(Continued)

*Primary Examiner* — Tim Heitbrink
(74) *Attorney, Agent, or Firm* — Rissman Hendricks & Oliverio, LLP

(57) ABSTRACT

An injection molding system comprising an actuator, a mounting plate, a mold and a manifold mounted between the mounting plate and the mold, the mounting plate being removably coupled to the mold, a valve pin comprising a pin stem and a pin connector; the actuator housing being mounted on or within the mounting plate for radial movement upon decoupling of the actuator housing from the mounting plate.

28 Claims, 13 Drawing Sheets

U.S. PATENT DOCUMENTS

| | | | |
|---|---|---|---|
| 5,545,028 A | 8/1996 | Hume et al. | |
| 5,554,395 A | 9/1996 | Hume et al. | |
| 5,635,227 A | 6/1997 | Whisenhunt et al. | |
| 5,660,369 A | 8/1997 | Gauler | |
| 5,674,439 A | 10/1997 | Hume et al. | |
| 5,820,803 A | 10/1998 | Hashimoto | |
| 5,858,301 A | 1/1999 | Hashimoto | |
| 5,871,786 A | 2/1999 | Hume et al. | |
| 5,885,628 A | 3/1999 | Swenson et al. | |
| 5,894,025 A | 4/1999 | Lee et al. | |
| 5,916,605 A | 6/1999 | Swenson et al. | |
| 5,948,448 A | 9/1999 | Schmidt | |
| 5,948,450 A | 9/1999 | Swenson et al. | |
| 5,980,237 A | 11/1999 | Swenson et al. | |
| 6,062,840 A | 5/2000 | Lee et al. | |
| 6,171,070 B1 | 1/2001 | Mitake | |
| 6,254,377 B1 | 7/2001 | Kazmer et al. | |
| 6,261,075 B1 | 7/2001 | Lee et al. | |
| 6,261,084 B1 | 7/2001 | Schmidt | |
| 6,287,107 B1 | 9/2001 | Kazmer et al. | |
| 6,294,122 B1 | 9/2001 | Moss et al. | |
| 6,309,208 B1 | 10/2001 | Kazmer et al. | |
| 6,343,921 B1 | 2/2002 | Kazmer et al. | |
| 6,343,922 B1 | 2/2002 | Kazmer et al. | |
| 6,361,300 B1 | 3/2002 | Kazmer et al. | |
| 6,419,870 B1 | 7/2002 | Lee et al. | |
| 6,436,320 B1 | 8/2002 | Kazmer et al. | |
| 6,464,909 B1 | 10/2002 | Kazmer et al. | |
| 6,554,604 B1 | 4/2003 | Schmidt | |
| 6,599,116 B2 | 7/2003 | Lee et al. | |
| 6,603,229 B1 | 8/2003 | Toye, IV | |
| 6,638,049 B1 | 10/2003 | Moss et al. | |
| 6,712,600 B2 | 3/2004 | Sattler et al. | |
| 6,729,871 B2 | 5/2004 | Sattler et al. | |
| 6,774,517 B2 | 8/2004 | Kowalski et al. | |
| 7,121,820 B2 | 10/2006 | Tooman et al. | |
| 7,234,929 B2 | 6/2007 | Vasapoli et al. | |
| 7,275,923 B2 | 10/2007 | Tooman et al. | |
| 7,588,436 B2 | 9/2009 | Tooman et al. | |
| 8,091,202 B2 * | 1/2012 | Galati et al. | 425/564 |

FOREIGN PATENT DOCUMENTS

| | | |
|---|---|---|
| DE | 3403603 A1 | 8/1985 |
| EP | 0635350 A1 | 1/1995 |
| EP | 0 920 970 | 7/2002 |
| EP | 1223018 B1 | 5/2005 |
| EP | 1223019 B1 | 5/2005 |
| FR | 2 889 098 A1 | 2/2007 |
| JP | 05318533 A | 3/1993 |
| KR | 10-0213663 | 5/1999 |
| WO | WO 2007-014954 | 8/2007 |

OTHER PUBLICATIONS

"T-10VG Installation and Seal Ring Details", DWG No. T10VG-001, Rev. 4, 1 page.
1976 Husky Hydraulic actuator, 5 pages.
KONA Bulletin 406, "Valve Gate Hot Runner System" Feb. 1993, 1 page.
Heat Pipe Manual—Synventive Molding Solutions, Heat Pipe Installation and Operating Manual, May 2002, pp. 51-55.
William J. Hume, Dynisco HotRunners, Valve Gate Hot Runner Systems, 7 pages.
Plastic World, "Zero vestige valve gate nozzle", Abstract Circle 219, Kona Corporation, Jun. 1995, p. 58.
Synventive Molding Solutions, Heat Pipe Installation and Operating Manual, May 2003, pp. 53-58.
EWIKON Heiβkanalysysteme GmbH & Co. Kg, "Electrical Needle Drive Unit for Valve Gate Systems", Oct. 2005.
International Search Report and Written Opinion in PCT/US2009/052524 mailed Feb. 22, 2010.
International Search Report and Written Opinion in PCT/US2010/033883 mailed Jan. 14, 2011.

* cited by examiner

APPARATUS FOR COUPLING AND UNCOUPLING AN INJECTION VALVE PIN

FIELD OF THE INVENTION

This invention relates to a coupling assembly that provides one or more of mechanical and thermal isolation between a pin and an actuator for moving the pin. In a particular embodiment an apparatus and method are disclosed for coupling and decoupling of a valve pin assembly to an actuator in an injection molding apparatus.

BACKGROUND

There are various industrial applications in which an elongated shaft, also referred to as a pin, must be driven translationally, i.e., in the direction of the elongated (longitudinal) axis of the pin. Typically, the pin has a pin head at one end for engagement by the drive actuator assembly. In various applications, it may be desirable or necessary to mechanically or thermally isolate, in at least some respect, the pin from the actuator assembly.

For example, in hot runner systems used in injection molding, valve pins are used to open and close the gate to a cavity in the mold in which the molded part is formed. Each valve pin is driven by an actuator assembly and extends through various parts of the injection molding machine which are at different temperatures (e.g. heated nozzle, heated manifold, cold mold and mounting plates). These temperature differences and/or differences in thermal expansion (during heating/cooling) of the various parts can place undesirable side load forces on the pin, causing the pin to become misaligned, bent or even broken. Still further, the pin may transmit heat from a hot part to a cold part of the machine, which again would be undesirable. There is thus a need to provide a mechanism for coupling a pin to an actuator which translationally drives the pin so as to maintain alignment, prevent deformation of the pin and/or prevent undesired thermal transmission to the actuator and/or other parts of the injection molding apparatus.

SUMMARY OF THE INVENTION

In accordance with the invention there is provided an injection molding system comprising an actuator, a mounting plate, a mold and a manifold mounted between the mounting plate and the mold, the mounting plate being removably coupled to the mold, the actuator comprising an axially drivable shaft or actuating member in an axial path of reciprocal travel and a housing removably coupled to the mounting plate;

a valve pin coupled to the shaft of the actuator for movement of the valve pin together with movement of the shaft, the valve pin comprising a pin stem and a pin connector;

the actuator having an actuator coupling adapted to reversibly couple to and decouple from the pin connector in a radial direction, the pin stem extending from the actuator into the manifold when the housing of the actuator is coupled to the mounting plate and the pin connector is received within the actuator coupling;

the actuator housing being mounted on or within the mounting plate for radial movement upon decoupling of the actuator housing from the mounting plate such that the pin connector is decouplable from the actuator coupling upon said radial movement while the actuator housing is disposed on or within the mounting plate, the actuator being removable from on or within the mounting plate leaving the valve stem behind extending into the manifold.

The pin connector typically comprises an adapter coupled to a top end of the stem, the adapter configured to be reversibly receivable within the actuator coupling in a radial direction (transverse to the axial). The adapter preferably comprises an enlarged head which is reversibly couplable to and decouplable from the top end of the stem.

The system is preferably adapted to allow the pin connector to travel a selected radial distance relative to the axial path of travel within the actuator coupling and remain coupled while the mounting plate remains coupled to the mold and the pin stem remains extended into the manifold.

The pin stem is preferably mounted to the manifold for radial movement of the pin stem together with the manifold relative to the mounting plate on expansion or movement of the manifold relative to the mounting plate.

The system is preferably adapted to allow the pin connector to travel a selected radial distance within the actuator coupling while the mounting plate remains coupled to the mold, the pin connector remains coupled to the actuator coupling and the pin stem remains extended into the manifold.

The mounting plate is preferably decouplable from the mold leaving the pin stem extended into the manifold when the pin head is decoupled from the actuator coupling.

In another aspect of the invention there is provided an injection molding system comprising an actuator, a mounting plate, a mold and a manifold mounted between the mounting plate and the mold, the mounting plate being removably coupled to the mold, the actuator comprising an actuating member drivable reciprocally along an axial path of travel and a housing removably coupled to the mounting plate;

a valve pin coupled to the actuating member of the actuator for movement of the valve pin together with movement of the actuating member, the valve pin comprising a pin stem and a pin connector;

the actuator having an actuator coupling adapted to reversibly couple to and decouple from the pin connector in a radial direction relative to the axial path of travel, the pin stem extending from the actuator into the manifold when the housing of the actuator is coupled to the mounting plate and the pin head is received within the actuator coupling;

the system being adapted to allow the pin connector to travel a selected radial distance within the actuator coupling and remain coupled while the mounting plate remains coupled to the mold and the pin stem remains extended into the manifold.

The actuator housing is typically mounted on or within the mounting plate for radial movement upon decoupling of the actuator housing from the mounting plate such that the pin connector is decouplable from the actuator coupling upon said radial movement while the actuator housing is disposed on or within the mounting plate, the actuator being removable from on or within the mounting plate leaving the valve stem behind extending into the manifold.

The pin connector preferably comprises an adapter removably coupled to an upstream end of the stem, the adapter being configured to be reversibly receivable within the actuator coupling in a radial direction. The adapter typically comprises an enlarged head which is reversibly couplable to and decouplable from the actuator coupling.

The mounting plate is preferably decouplable from the mold such that the the pin stem remains extended into the manifold when the pin connector is decoupled from the actuator coupling.

In another aspect of the invention there is provided an injection molding system comprising an actuator, a mounting plate, a mold and a manifold mounted between the mounting plate and the mold, the mounting plate being removably coupled to the mold,
- the actuator comprising a motor and a shaft reciprocally drivable by the motor along an axial path and a housing removably coupled to the mounting plate;
- a valve pin coupled to the shaft of the actuator for movement of the valve pin together with movement of the shaft, the valve pin comprising a pin stem and a pin connector;
- the actuator having an actuator coupling adapted to reversibly couple to and decouple from the pin connector in a radial direction, the pin stem extending from the actuator into the manifold when the housing of the actuator is coupled to the mounting plate and the pin connector is received within the actuator coupling;
- the actuator housing being mounted on or within the mounting plate for radial movement upon decoupling of the actuator housing from the mounting plate such that the pin connector is decouplable from the actuator coupling upon said radial movement while the actuator housing is disposed on or within the mounting plate, the mounting plate being decouplable from the mold leaving the stem of the valve pin behind extending into the manifold.

In another aspect of the invention there is provided a method of disassembling an assembled injection molding system comprising an actuator, a mounting plate, a mold and a manifold mounted between the mounting plate and the mold, the mounting plate being removably coupled to the mold, wherein the actuator comprises an axially drivable actuating member or shaft and a housing removably coupled to the mounting plate; wherein a valve pin is coupled to the actuating member or shaft of the actuator for reciprocal movement of the valve pin together with movement of the shaft along an axial path of travel, the valve pin comprising a pin stem and a pin connector, the actuator having an actuator coupling interconnected to a downstream end of the actuating member, the coupling being adapted to reversibly couple to and decouple from the pin connector in a direction radial to the axial path of travel, the method comprising:
- decoupling the actuator housing from the mounting plate;
- moving the actuator housing radially on or within the mounting plate a distance sufficient to decouple the pin connector from the actuator coupling;
- removing the actuator from on or within the mounting plate leaving the valve pin stem behind extended into the manifold.

Such method can further comprise decoupling and removing the mounting plate from the mold leaving the valve pin behind extended into the manifold. Such a method can further comprise removing the actuator and the mounting plate together leaving the valve pin behind extended into the manifold.

In another aspect of the invention there is provided a method of disassembling an assembled injection molding system comprising an actuator, a mounting plate, a mold and a manifold mounted between the mounting plate and the mold, the mounting plate being removably coupled to the mold, wherein the actuator comprises an axially drivable actuating member or shaft and a housing removably coupled to the mounting plate; wherein a valve pin is coupled to the actuating member or shaft of the actuator for reciprocal movement of the valve pin together with movement of the shaft along an axial path of travel, the valve pin comprising a pin stem and a pin connector, the actuator having an actuator coupling adapted to reversibly couple to and decouple from the pin connector in a radial direction relative to the axial path of travel, the method comprising:
- decoupling the actuator housing from the mounting plate;
- moving the actuator housing radially on or within the mounting plate a distance sufficient to decouple the pin connector from the actuator coupling;
- removing the mounting plate from the mold leaving the valve pin stem behind extended into the manifold.

Such a method can further comprise removing the actuator from on or within the mounting plate leaving the valve pin stem behind extended into the manifold. Such a method can further comprise removing the actuator and the mounting plate together leaving the valve pin stem behind extended into the manifold.

In another aspect of the invention there is provided an injection molding apparatus comprising:
- an electric actuator motor removably coupled to a plate;
- an actuator coupling mounted to a drive shaft of the motor;
- a valve pin having an elongated stem defining a pin axis and a pin head at one end of the stem; and
- a pin head adapter mounted to the pin head;
- the actuator coupling having a radial recess disposed transverse to the pin axis and sized to receive the pin head adapter; and
- a radial clearance provided between the pin head adapter and recess to allow movement in any radial direction of the pin head adapter in the recess.

Typically the motor, when decoupled from plate, is movable radially on or within the plate a distance sufficient to decouple the adapter from the actuator coupling.

In another aspect of the invention there is provided a method for decoupling a valve pin assembly from a mounting plate in an injection molding system, the system including:
- an electric actuator motor removably coupled to the plate and disposed in a chamber in the plate, the chamber being sized to provide a radial clearance with the motor so as to allow radial movement of the motor in the chamber when the plate and motor are decoupled;
- an actuator coupling mounted to a drive shaft of the electric motor;
- a valve pin assembly comprising:
  - a valve pin having an elongated stem defining a pin axis and having a pin head at one end of the stem; and
  - a pin head adapter mounted to the pin head;
- the actuator coupling having a radial recess disposed transverse to the pin axis and adapted to radially receive the pin head adapter, and a radial clearance provided between the pin head adapter and recess to allow movement in any radial direction of the adapter in the recess;
- the method comprising the steps of:
  - decoupling the motor from the plate;
  - moving the motor radially in the chamber to radially remove the pin head adapter from the radial recess in the coupling adapter.

In another aspect of the invention there is provided an injection molding apparatus comprising;
- a mounting plate coupled to a mold and a manifold mounted between the mounting plate and the mold:
- an electric actuator removably coupled to the mounting plate, the electric actuator comprising a motor driving a shaft along an axial path of reciprocal travel;

an actuator coupling connected to a downstream end of the shaft;

a valve pin having an elongated stem defining a pin axis and a pin connector having a selected configuration mounted at an upstream end of the stem;

the actuator coupling forming a recess complementary in configuration to the configuration of the pin connector, the complementary configuration of the recess or slot being formed to receive the pin connector in a direction radial to the axial path of travel of the shaft.

The actuator coupling preferably comprises a housing connected to the end of the shaft, the housing having walls enclosing and forming the recess in a configuration that requires insertion and removal of the pin connector in a direction radial to the axial path of travel of the shaft.

The stem typically extends from the pin coupling into the manifold when the pin connector is received within the actuator coupling, the actuator coupling and pin connector are formed to provide a radial clearance between the actuator coupling and pin connector sufficient to allow expansion between the manifold and the mounting plate when the manifold is heated to operating temperature. The radial clearance preferably allows the pin connector and actuator coupling to move in a radial direction relative to each other when the pin connector is received within the actuator coupling. The pin connector typically comprises an adapter removably coupled to the upstream end of the stem. The pin connector typically comprises a pin head formed at or connected to the upstream end of the pin stem, the adapter being removably attachable to the pin head. The pin head is typically formed as an integral part of the upstream end of the pin stem protruding radially from the pin axis and the adapter is formed as an enlarged part protruding radially beyond the radial protrusion of the pin head when the adapter is attached to the pin head.

The pin can extend from the actuator coupling into the manifold when the pin connector is coupled to the actuator coupling and, when the actuator is decoupled from the mounting plate, the actuator is movable radially relative to the axis of the pin on or within the mounting plate a distance sufficient to decouple the pin connector from the actuator coupling without decoupling the mounting plate from the mold.

In another aspect of the invention there is provided an injection molding apparatus comprising;

a mounting plate coupled to a mold and a manifold mounted between the mounting plate and the mold:

an actuator removably coupled to the mounting plate, the actuator comprising an actuating member drivable along an axial path of reciprocal travel;

an actuator coupling interconnected to a downstream end of the actuating member;

a valve pin having an elongated stem defining a pin axis and a pin connector having a selected configuration mounted at an upstream end of the stem;

the actuator coupling forming a recess complementary in configuration to the configuration of the pin connector, the complementary configuration of the recess being formed to receive the pin connector in a direction radial to the axial path of travel of the actuating member.

In such an embodiment the actuator coupling typically comprises a housing interconnected to the downstream end of the actuating member, the housing having walls enclosing and forming the recess in a configuration that requires insertion and removal of the pin connector in a direction radial to the axial path of travel of the shaft.

In such an embodiment the pin can extend from the actuator coupling into the manifold when the pin connector is coupled to the actuator coupling and, when the actuator is decoupled from the mounting plate, the actuator is movable radially relative to the axis of the pin on or within the mounting plate a distance sufficient to decouple the pin connector from the actuator coupling without decoupling the mounting plate from the mold.

BRIEF DESCRIPTION OF THE DRAWINGS

FIGS. 7A-7F illustrate a series of method steps wherein FIG. 7A is a side schematic sectional view (similar to FIG. 5) showing the actuator and valve pin assembly coupled and mounted in an injection molding apparatus; FIG. 7B shows the housing of the actuator decoupled from the mounting or clamp plate; FIG. 7C is a view similar to FIG. 7A after the actuator has been decoupled from the mounting plate and moved radially to the left to decouple the pin connector or adapter from the coupling at the downstream end of the actuator; FIG. 7D is a view similar to FIG. 7C but showing the actuator to being removed from the mounting plate while the valve pin assembly remains behind extended into the manifold; FIG. 7E is view showing the actuator having been removed from its former position disposed within or on the mounting plate leaving the pin stem behind mounted to the manifold; and FIG. 7F is a view showing the top mounting or clamp plates having been removed or decoupled from the mold together with the actuator having been decoupled from the pin connector leaving the pin stem behind mounted to the manifold.

DETAILED DESCRIPTION

Figure 1:
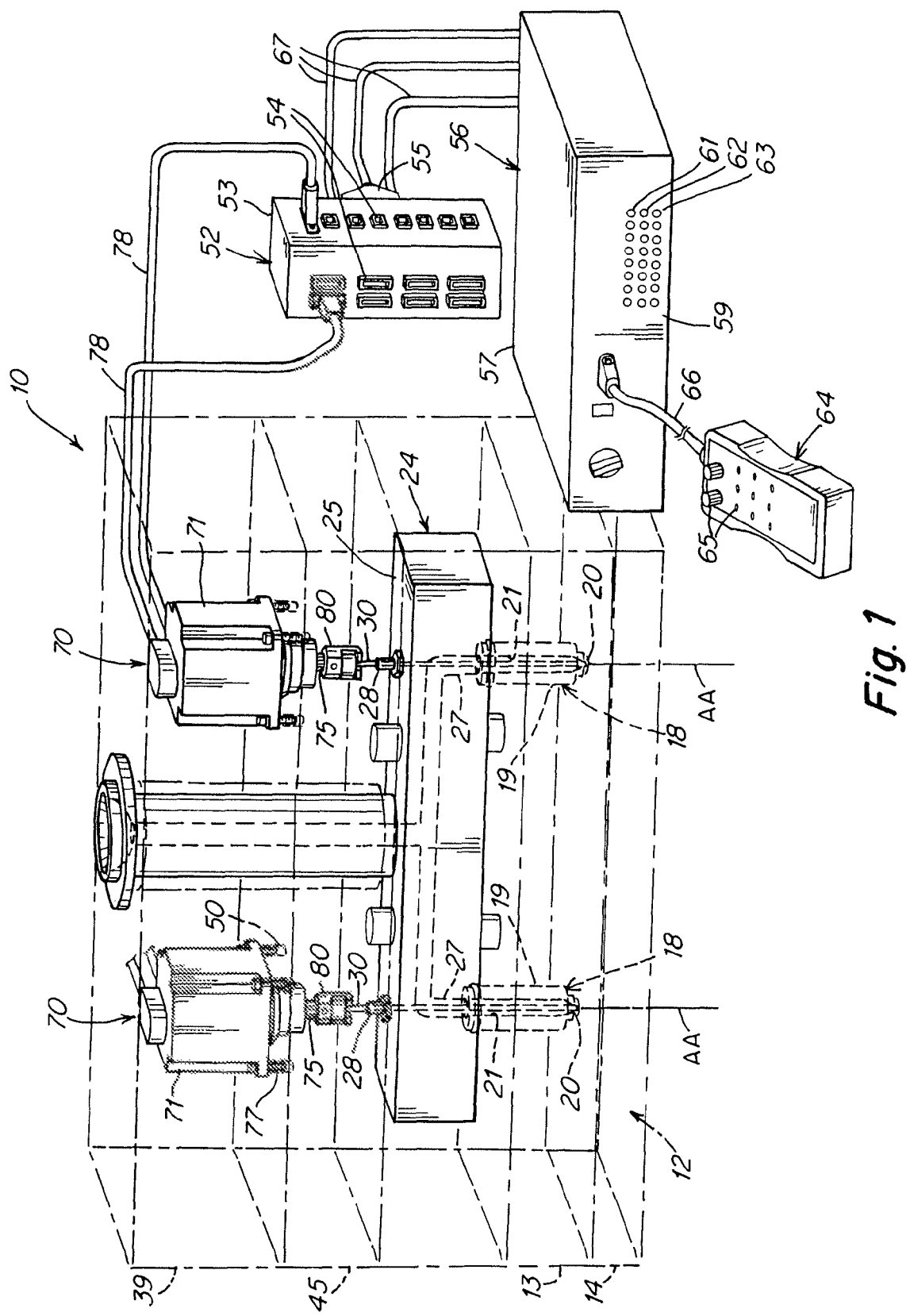
FIG. 1 is a schematic overview of an injection molding apparatus including one embodiment of the coupling apparatus of the invention.

FIG. 1 is an overview of a coupling apparatus mounted in an injection molding apparatus according to one embodiment of the present invention. The coupling apparatus enables radial engagement and disengagement of an actuator and a valve pin assembly such that the valve pin assembly can remain extended into the manifold while the actuator either alone or together with the mounting plate, is/are removed.

An injection molding apparatus 10 includes a series of layered components forming a stack. Here the component layers of the stack are shown vertically arranged, one on top of another, although in use the entire stack would typically be rotated 90°. For ease of description, the stack will be described as a vertical stack even through in use it is not so disposed. At one end of the stack, here referred to as the bottom end of the stack, a mold 12 has a cavity (not shown) for receiving hot molten plastic fed through a gate 20 of an injection nozzle 18. The nozzle 18 is mounted in one or more metal (e.g. stainless steel) plates, including a heated manifold 24 and one or more other spacer, mounting or mold plates 13, 14. The manifold 24 is heated to maintain the nozzle 18 at an elevated temperature for delivery of the molten plastic. The mold cavity and plates 13, 14 are relatively cool compared to the manifold 24 to enable solidification of the injected molten plastic to form a solid plastic article within the cavity of the mold.

The nozzle 18 is an elongated tubular article 19 typically made of stainless steel and having a central axial bore 21 through which the molten plastic travels to the gate 20 and into the mold cavity. Also in the nozzle bore, aligned along the central bore axis, is an axially elongated valve pin 30 having an axially elongated stem 31, which defines the valve pin axis AA. At one end of the stem, designed to seat and unseat in the nozzle gate for purposes of opening and closing the gate, and effectively starting and stopping flow of the molten plastic to the mold cavity, the stem has an angular or tapered lowermost tip 32. At the opposite or upstream (top) end 33 of the valve stem 31 is a pin head 34 which in the present embodiment comprises a radially enlarged cylindrical member. The pin head 34 is designed to couple and decouple with an actuator, the actuator being a mechanism for driving the valve pin along an axial path of travel A typically substantially coincident with the central axial bore AA of the nozzle 18 which is substantially coincident with the pin axis AA. The valve stem also extends through an elongated plastic feed bore 27 in the heated manifold 24, typically also substantially coaxial with the nozzle bore. The valve stem 31 is guided into and mounted to the manifold 24 by a bushing 28 which receives, guides and mounts the valve stem 31 in the manifold plastic feed bore 27. The pin head 34 extends axially upstream beyond and from the bushing on the upstream or top side 25 of the manifold.

The pin head may be formed integral with the valve stem (as a single part) or it may be formed as a separate part and then secured to the upper or top end of the valve stem. It may or may not be radially enlarged but is typically formed in a radially enlarged configuration for ease of ready connectivity to and disconnectivity from an adapter component as described below.

Above/upstream of the manifold 24, a pair of upper and lower mounting plates 39, 45 are provided in or on which the actuator 70 is mounted. The plates 39 and 45 are sometimes referred to as top clamping plates, clamping plates or backing plates. The actuator 70 is typically a linear actuator, such as an electrically powered motor actuator, for driving the valve pin stem axially (linearly) along the coaxial bores of the manifold and nozzle. The actuator can alternatively comprise a hydraulically or pneumatically driven actuator having an actuating member such as a piston that is reciprocally drivable along an axial path of travel by hydraulic or pneumatic fluid. In embodiments where the actuator comprises an electric motor, the motor is enclosed in a housing 71 which is typically disposed within a receiving aperture or chamber 40 in the upper mounting plate 39 and/or a chamber 40a in the lower mounting plate 45. Where the actuator is a hydraulic or pneumatic device, a similar housing for the driven actuating member is provided. In the embodiment shown, the housing 71 is fixed to the lower mounting plate 45 by threaded bolts 77 which extend into complementary threaded holes 50 in plate 45 so as to removably couple the actuator housing 71 to the mounting plate 39 (see FIG. 5). The mounting plates 39, 45 are removably coupled to the mold typically by bolts or similar reversible fastening mechanisms. The chamber 40 of the upper mounting plate 39 (in which the motor housing 71 is disposed) is actually a through bore in the upper plate 39 extending from the top surface 42 to the bottom surface 43. A drive shaft 75 of the electrically powered actuator having a motor extends downwardly into a co-axial bore 40a/40b in the lower mounting plate 45 (40/40a/40b are coaxial).

An actuator coupling 80 is attached to or mounted on the actuator shaft 75 and is also disposed in the bore 40a/40b of the lower mounting plate 39 when the actuator is connected to the mounting plate. The actuator coupling includes a radial recess 83, disposed laterally (traverse to the elongated valve pin axis. The recess has a radial recess opening 82 that allows a pin head adapter 94 to be radially inserted into and removed from the radial recess. The coupling 80 also includes a radial slot 84, connected (open) to the radial recess and extending downwardly to the lower surface 90 of the coupling. The radial slot has a radial slot opening 85 through which the valve stem 31 can be readily radially inserted or translated within (or removed from) the slot 84 while the adapter 94 is simultaneously radially inserted or translated within (or removed from) the radial recess 82. The coupling 80 has walls 91 that form and act as a housing for the radial recess 83 and radial slot 84. As shown, the pin connector 94 and the recess 83 and recess opening 84 are configured to have a complementary geometry, size, shape and configuration so as to enable the pin connector to be received within the recess 83 and fully surrounded and contained within walls 91 and also to require that the pin connector 94 is receivable within and removable from the recess 83 only by movement of the pin connector 94 in a radial direction R, FIG. 2B, transverse to the axial path of travel A of the actuating member 75 of the actuator 70. The pin connector 94 is slidable by manual force along radial direction R into and out of the recess 83 and recess opening 84. As shown when the pin connector 94 is slid into and out of recess 83 and opening 84, the pin stem 31 is simultaneously slidable radially through slot opening 85 into slot 84. The walls 91 act to retain and couple the pin connector 94 and associated pin stem 31 to the shaft 75 when the connector 94 is received within recess 83 and stem 31 in slot 84.

In addition, the radial recess 82 is sized and configured to provide a radial clearance 2 in all radial directions between the valve pin adapter 94 and the recess 82 when/while the adapter is received and coupled within the recess 82 of the coupling 80. This radial clearance 2 allows movement in any radial direction of the valve pin adapter while it is mounted in the recess of the actuator coupling, so as to accommodate differences in thermal expansion between various components of the injection molding apparatus such as between the manifold 24 and the mounting plates 39, 45. As previously described, the valve stem 31 is mounted to a manifold 24 when the system is assembled, the manifold being heated during the course of startup to a higher temperature than the relatively cold mounting plates 39, 45 and cold actuator 70. During the time when the manifold 24 is being heated to a higher temperature than the mounting plates and actuator, it is desirable to provide a radial clearance to allow the valve pin assembly (pin 30 and adapter 94), which is mounted to the manifold by the bushing 28 and travels radially therewith and is also being heated via the manifold, to move radially together with the manifold with respect to the mounting plate and the axial path of travel of the actuator so as to prevent the application of undesirable side bending forces on the valve pin assembly. These side forces may bend or break the valve stem or otherwise interfere with proper alignment and operation of the valve pin assembly and actuator.

The structure and operation of this apparatus will be further explained in detail based on component part drawings (FIGS. 2-6) and sequence (of operation) drawings (FIGS. 7A-7F).

Figure 2A:
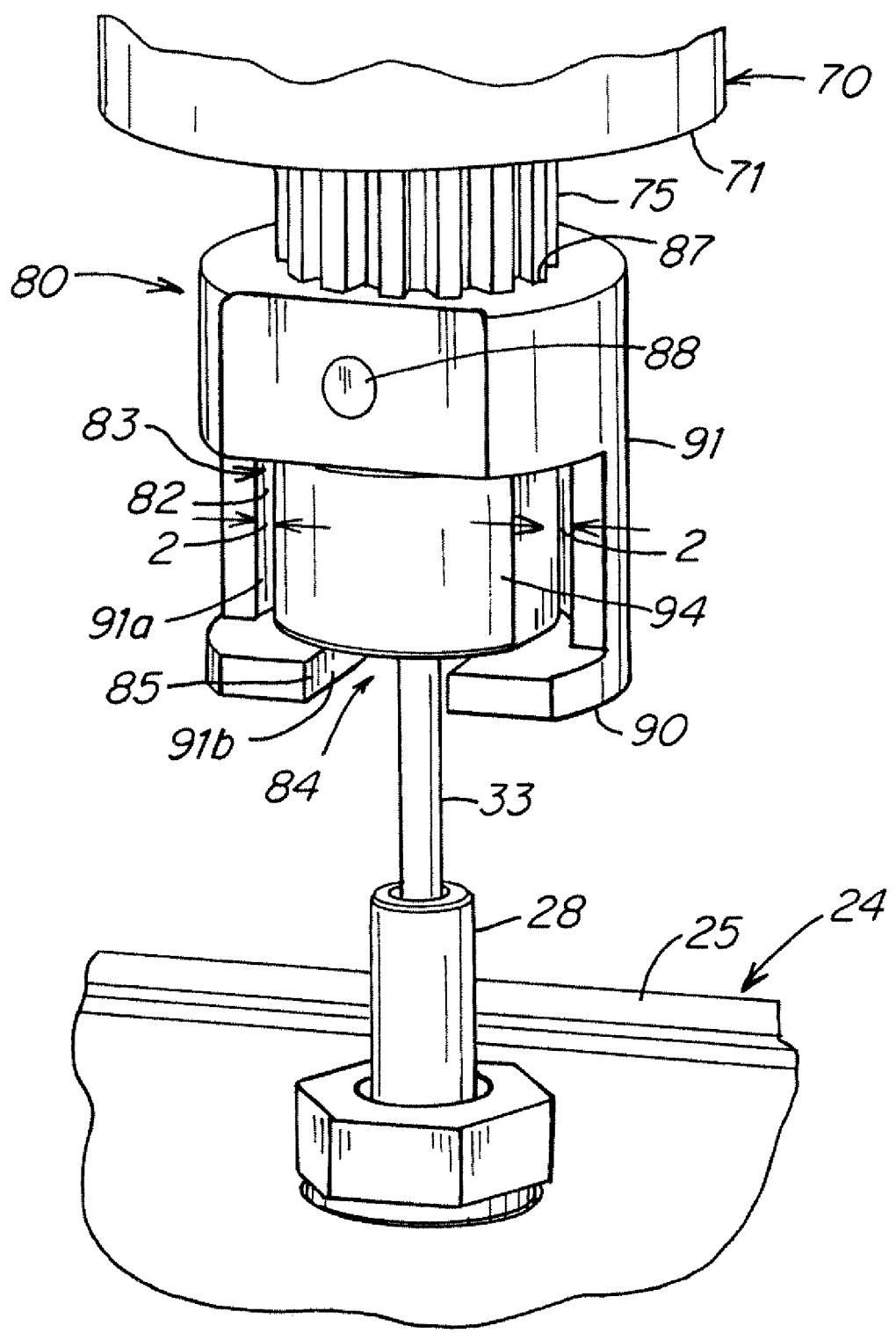
FIG. 2A is an exploded partial schematic view of the coupling apparatus of FIG. 1, in an assembled state.
Figure 2B:
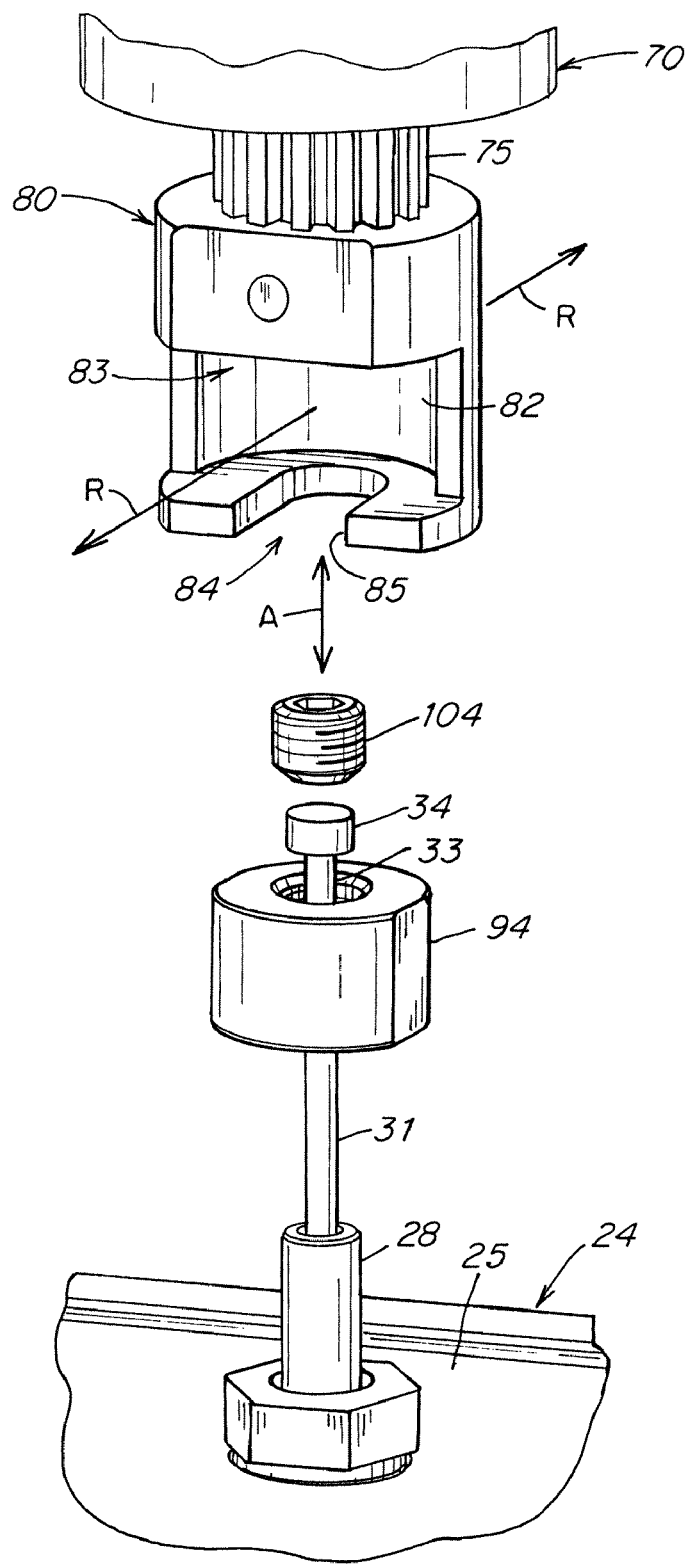
FIG. 2B is an exploded partial schematic view showing the coupling apparatus of FIG. 1, in a disassembled state.
Figure 3A:
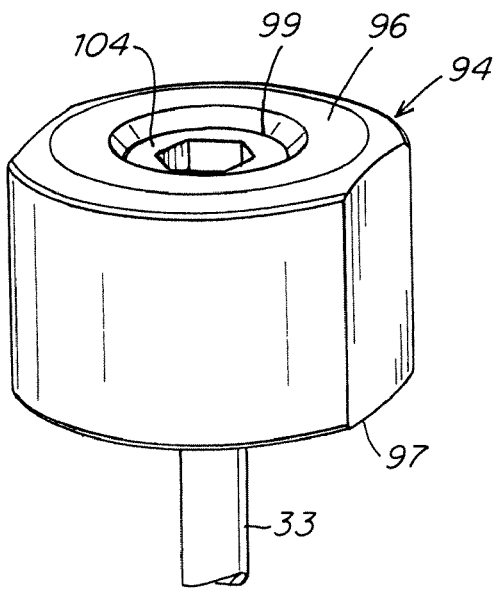
FIG. 3A is an enlarged schematic view of a valve pin head and a pin head adapter, in an assembled state, according to one embodiment.
Figure 3B:
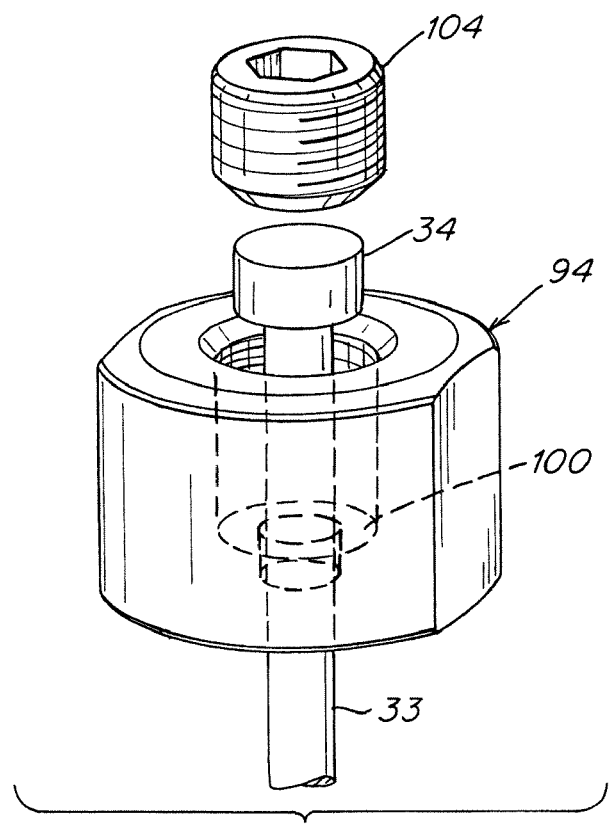
FIG. 3B is an exploded view of the pin head and adapter of FIG. 3A in a disassembled state.

FIGS. 2A-2B show one embodiment of the coupling apparatus in an assembled state (FIG. 2A) and a disassembled state (FIG. 2B). In FIG. 2A, the upper end of the valve pin is shown extending upwardly from a manifold bushing 28 secured to the top 25 of the manifold. The pin head 34, at the top end of the valve pin, is disposed within the pin head adapter 94 so it is not visible in FIG. 2A. The adapter is radially received in the radial recess 82 of the actuator coupling, while the valve stem 31 resides in the radial slot 84 of the coupling. As previously described, there is a radial clearance 2 provided between the interior surface 91 a of the walls 91 defining the radial recess 82 and outside surface of the adapter 94, and between the walls 91 b defining the radial slot 84 and valve stem 31, to allow for radial movement of the valve pin assembly (here the valve stem 31, pin head 34 and pin head adapter 94) with respect to the axial drive path A of the actuator 70. The actuator coupling 80 is connected to the spline shaft 75 of the electric actuator motor, by a pin 88 which extends through a bore 87 in the coupling and into a bore in the shaft. This prevents rotation of the coupling relative to the actuator shaft.

FIG. 2B shows the disassembled actuator coupling and pin head adapter. A cylindrical set screw 104 having outer threads is adapted for threaded engagement with the pin head adapter. This is further illustrated in FIG. 3A-3B. The pin head adapter 94 has a central axial through bore 99 extending from the top surface 96 to the bottom surface 97 of the adapter. The bore receives the upper end of the valve stem and pin head. The pin head sits on a shoulder 100 in the central bore and is secured in the adapter by screwing the set screw into a threaded upper portion of the bore, creating a pressure engagement of the pin head and adapter. In this embodiment, the adapter essentially functions as an enlarged pin head. In another embodiment, the adapter may not be required, as the pin head itself could be disposed in the radial recess of the actuator coupling.

FIG. 1 also shows the electrical cables for connecting the actuator to a controller. In this embodiment, the actuator is an electric motor having a linearly drivable shaft for engaging the pin head for axial movement of the valve stem in the manifold and nozzle so as to open and close the nozzle opening at the gate, by seating and unseating the valve stem tip in the gate. Controlling the valve stem position in the gate is important for creating clean injection molded parts without residues of undesired plastic, and to avoid freezing or closing off the gate with solidified plastic. In this embodiment, an electronic controller 56 is provided which monitors and controls the operation of the actuator, and thus axial movement of the actuator shaft and valve stem. A pair of electrical cables 78 connect the actuator motor 70 to a junction box 52. The junction box can be mounted in the mounting plates, along with the motor. This allows the actuator motor to remain with the mounting plates when they are (together) removed from the manifold, leaving behind the valve stem extended into the manifold and nozzle, and while leaving the electrical actuator wired to the junction box 52. The junction box housing 53 includes a series of electrical connectors 54 for receiving the electrical cables from the motor, and other connectors 55 for electrical cables 67 connecting the junction box to the controller for transmitting control signals from the controller. A user hand-held input device 64 is connected (via cable 66) to the front face 59 of the controller box 57 for inputting instructions (via hand-held buttons and knobs 65) to the controller regarding operation of the valve stem. In this embodiment, the control system includes sensors for monitoring the position of the valve pin in the gate, and resetting that position if it deviates from a desired position. The controller box 57 has a three series of LEDS for each of 8 actuators, the upper series 61 indicating "valve gate opened", the middle series 62 indicating "valve gate enabled", and the lower series 63 indicating "valve gate closed." Control signals, and feedback sensor signals are transmitted to and from the controller for monitoring and adjusting the pin position during the injection molding cycle. The sensitivity of these adjustments, which must be transmitted via the drive shaft to the valve pin, make the structure and function of the coupling adapter of particular importance in the present embodiment. The coupling adapter can isolate both undesirable mechanical effects (e.g., vibration, rotation) and thermal effects from interfering with this sensitive control operation.

Figure 4:
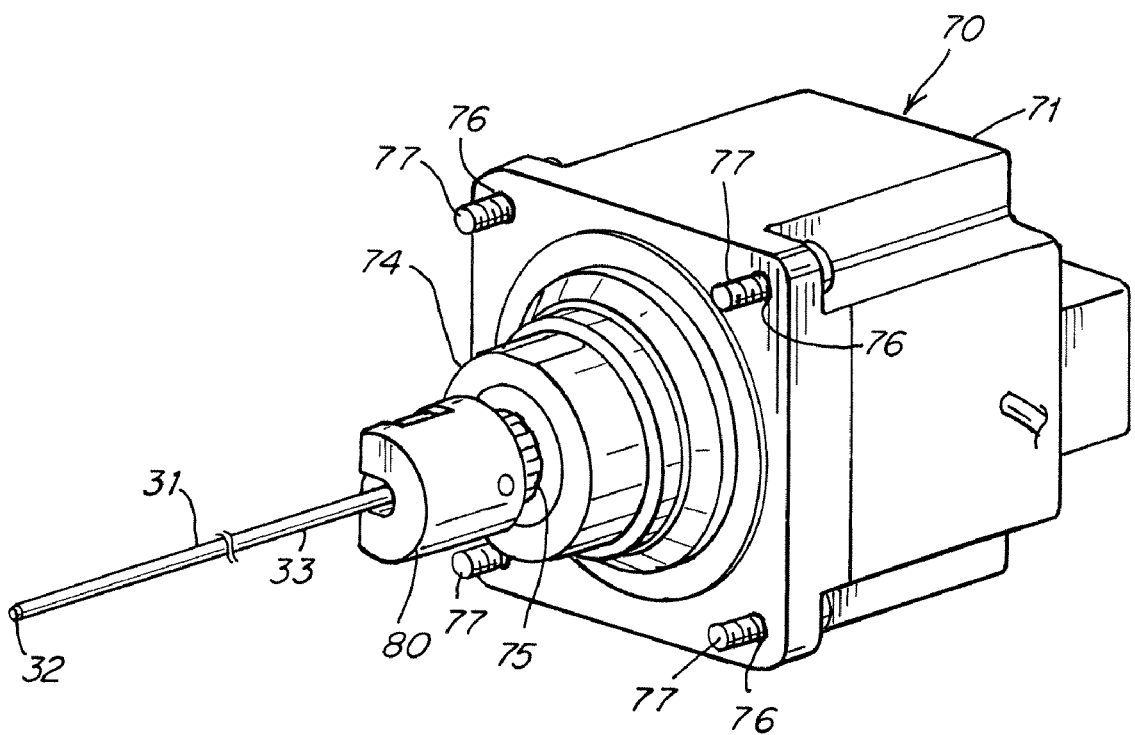
FIG. 4 is a perspective view of one embodiment of an actuator coupled to a valve pin.
Figure 5:
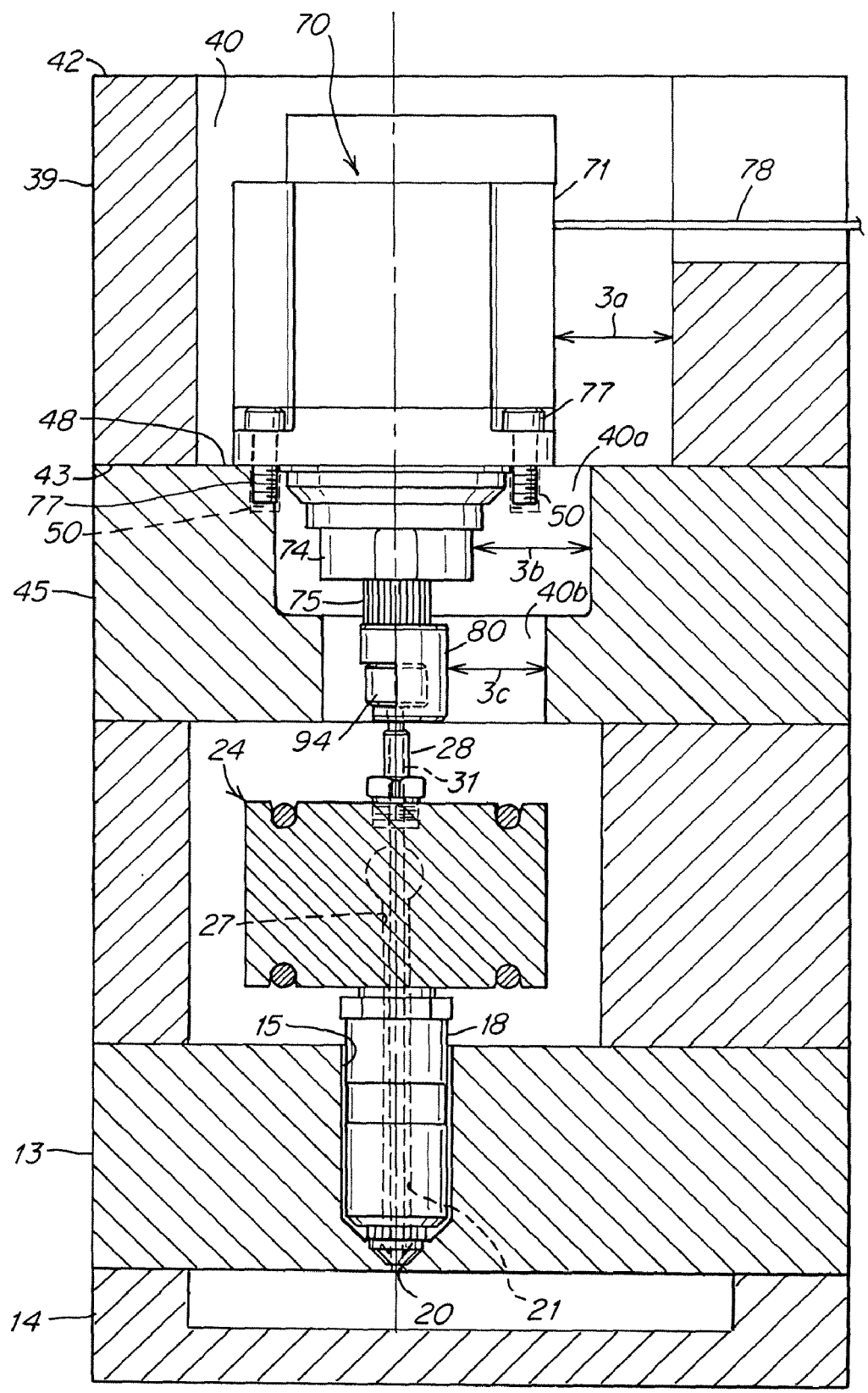
FIG. 5 is a schematic partial cross-sectional view of the actuator and valve pin of FIG. 4 mounted in an injection molding apparatus.
Figure 6:
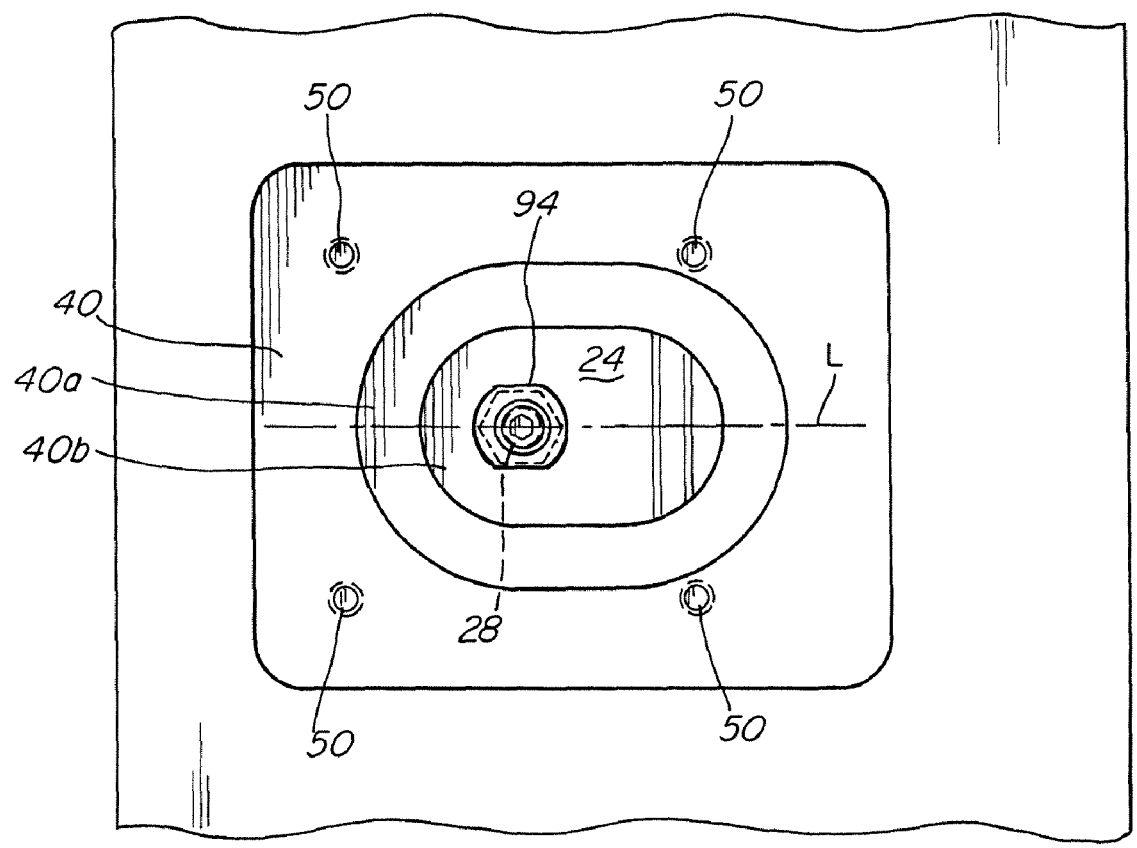
FIG. 6 is a top plan view of the apparatus of FIG. 5, with the actuator removed.

FIGS. 4-6 show in greater detail a particular embodiment of the electric actuator and valve stem assembly. FIG. 4 shows an actuator having an electrically powered drive motor contained in a rectangular outer housing 71 that encases the motor, and including four bores 76, one in each corner of the housing, for receiving bolts 77 that removably couple the motor housing 71 to the lower mounting plate 45. Four complementary tapped holes 50 are provided in the upper surface 48 of the lower mounting plate 45 for receiving the bolts 77 and securing the motor housing to the plate. This prevents rotational and other movement of the housing of the motor with respect to the mounting plates and manifold and the injection molding apparatus generally. Extending downwardly from the motor housing 71 is a cylindrical projection 74 from which the cylindrical drive shaft 75 of the motor extends. Coupled to the downstream end of the drive shaft is the actuator coupling 80 and extending axially downstream from the coupling 80 is the valve stem 31.

FIG. 5 is a cross section showing the injection molding stack. As previously described, a heated manifold 24 is disposed between the mounting plates 39/45 and mold plates 13/14. In use, the mounting plates and mold plates are fixedly secured together under high clamp pressure, so as to withstand high injection molding forces. A nozzle 18 extends through a bore 15 in the upper mold plate 13, and seats and unseats in the gate 20 to the injection mold cavity in plate 14. The actuator housing 71 is disposed in a chamber 40 of the upper mounting plate 39, with a radial clearance 3a provided in at least one radial direction so as to facilitate the radial coupling and decoupling of the pin head adapter and actuator coupling. Similarly, there is a radial clearance 3b/3c to allow the projecting shaft 75 and adapter 80 to move radial in the plates. FIG. 6 is a top plan view of the apparatus of FIG. 5, but with the electric motor removed. The chamber 40 has a rectilinear cross section. Below the chamber 40, the upper bore 40a has an oval cross section, and the lower bore 40b also has an oval but smaller, cross section, providing a radial clearance along the long axis L of the oval, to facilitate the assembly and disassembly steps described below.

Figure 7A:
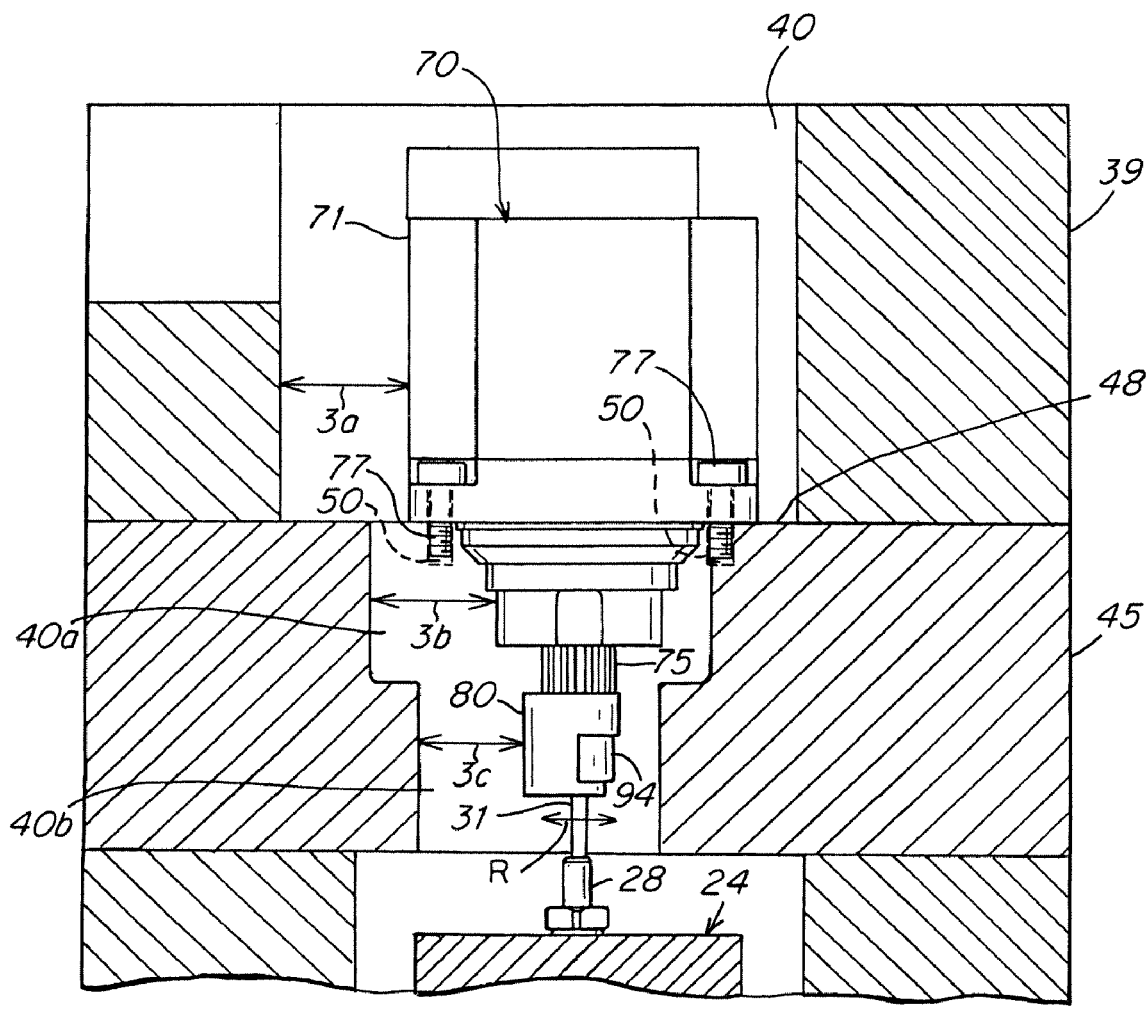

FIGS. 7A-7F illustrate a variety of steps for decoupling the actuator from the mounting plate 39 and for decoupling the valve pin assembly 30, 94 from the actuator coupling 80 and the mounting plate 39, 45, according to one embodiment. In FIG. 7A, the actuator is shown coupled to the valve pin assembly, with the actuator secured to the lower mounting plate and the valve pin assembly mounted in the actuator coupling. This illustrates the actuator and valve pin assembly as assembled during the injection molding cycle, wherein the axial drive path of travel AA of the actuator is substantially axially aligned with the valve stem axis, as the valve stem extends through the axis of the plastic feed bores of the manifold 27 and nozzle 18. The mounting plates 39 45 are clamped to the mold 12 with the manifold 24 secured between the mounting plates and mold.

Figure 7B:
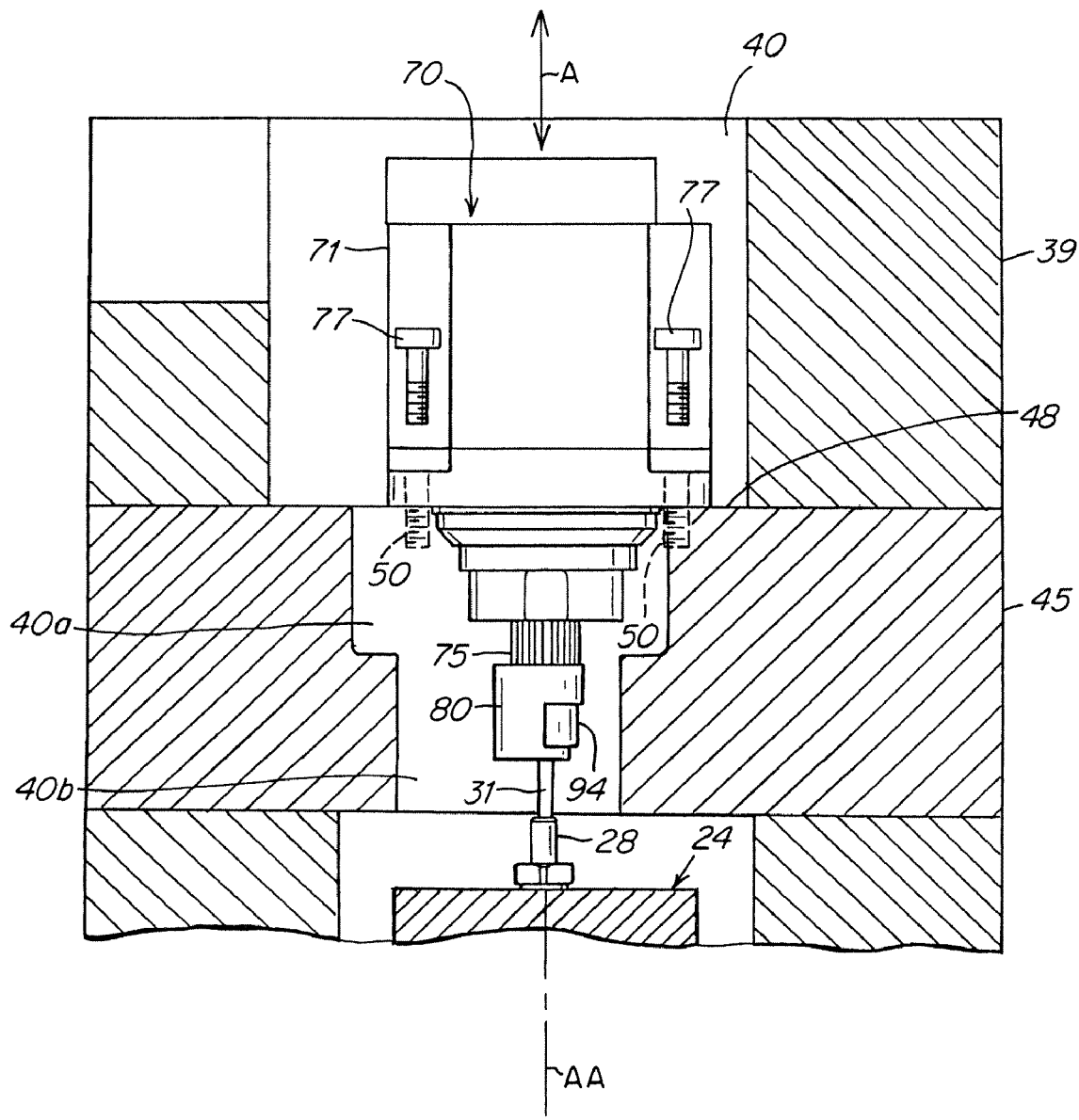
Figure 7C:
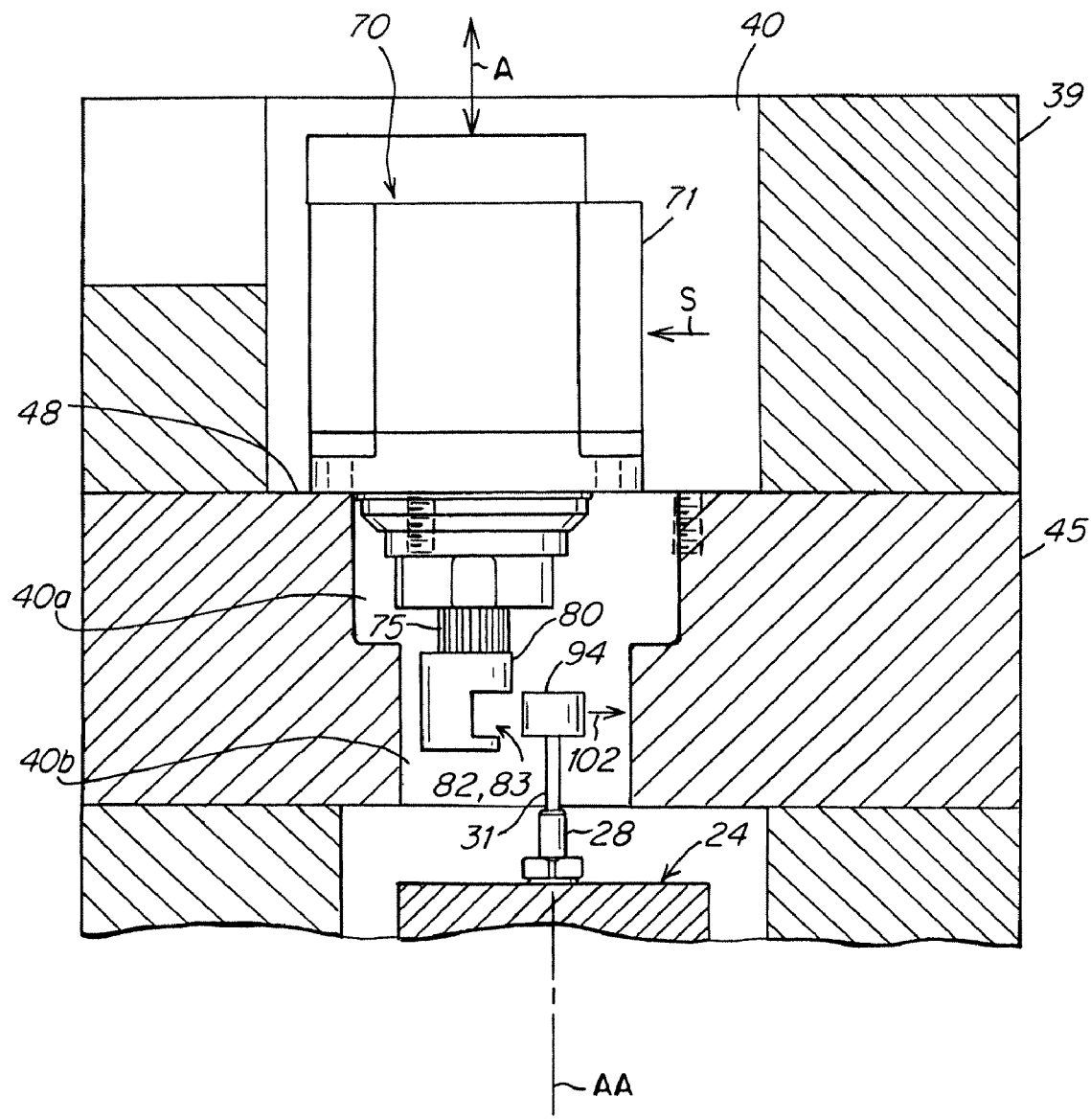
Figure 7D:
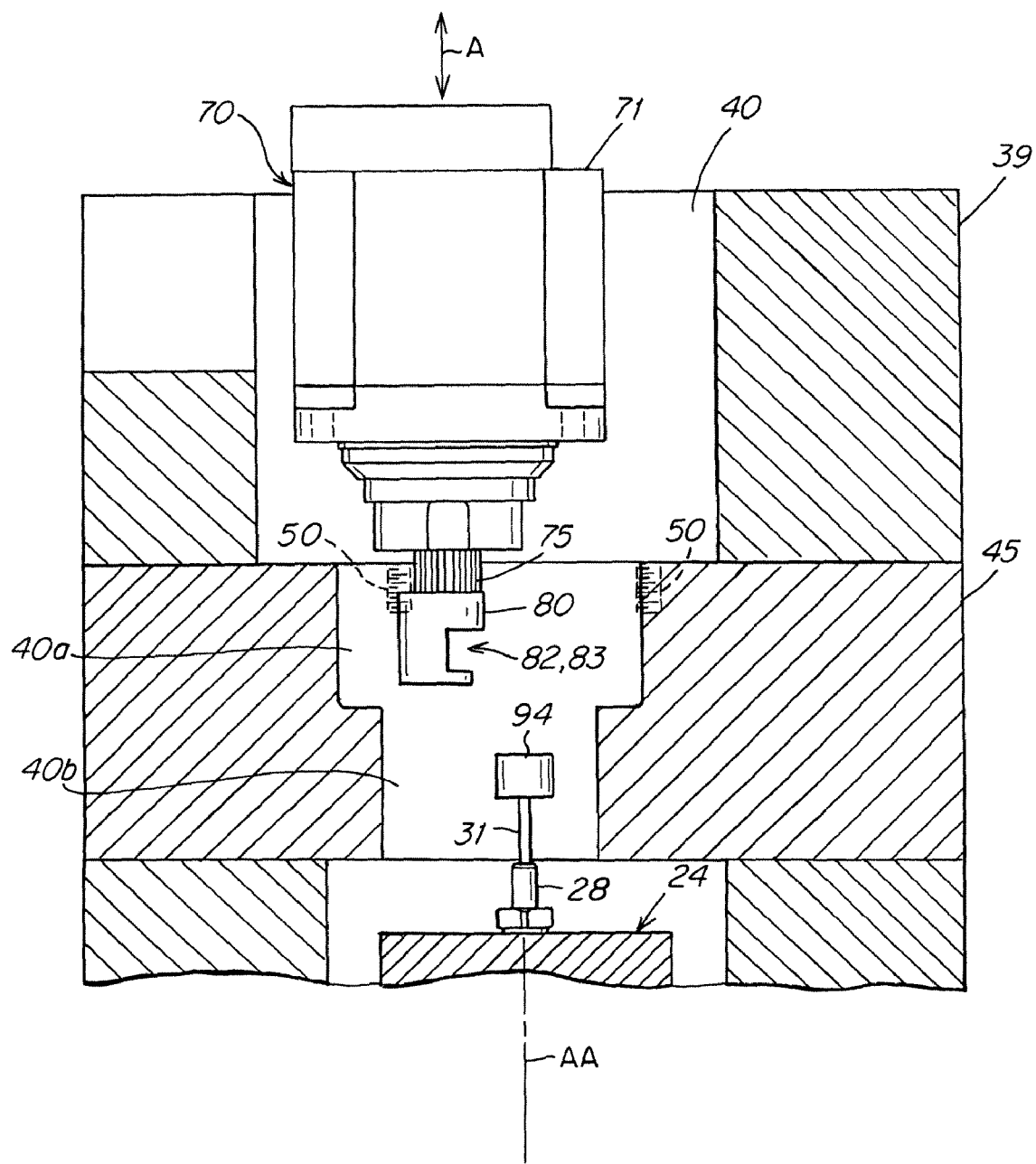
Figure 7E:
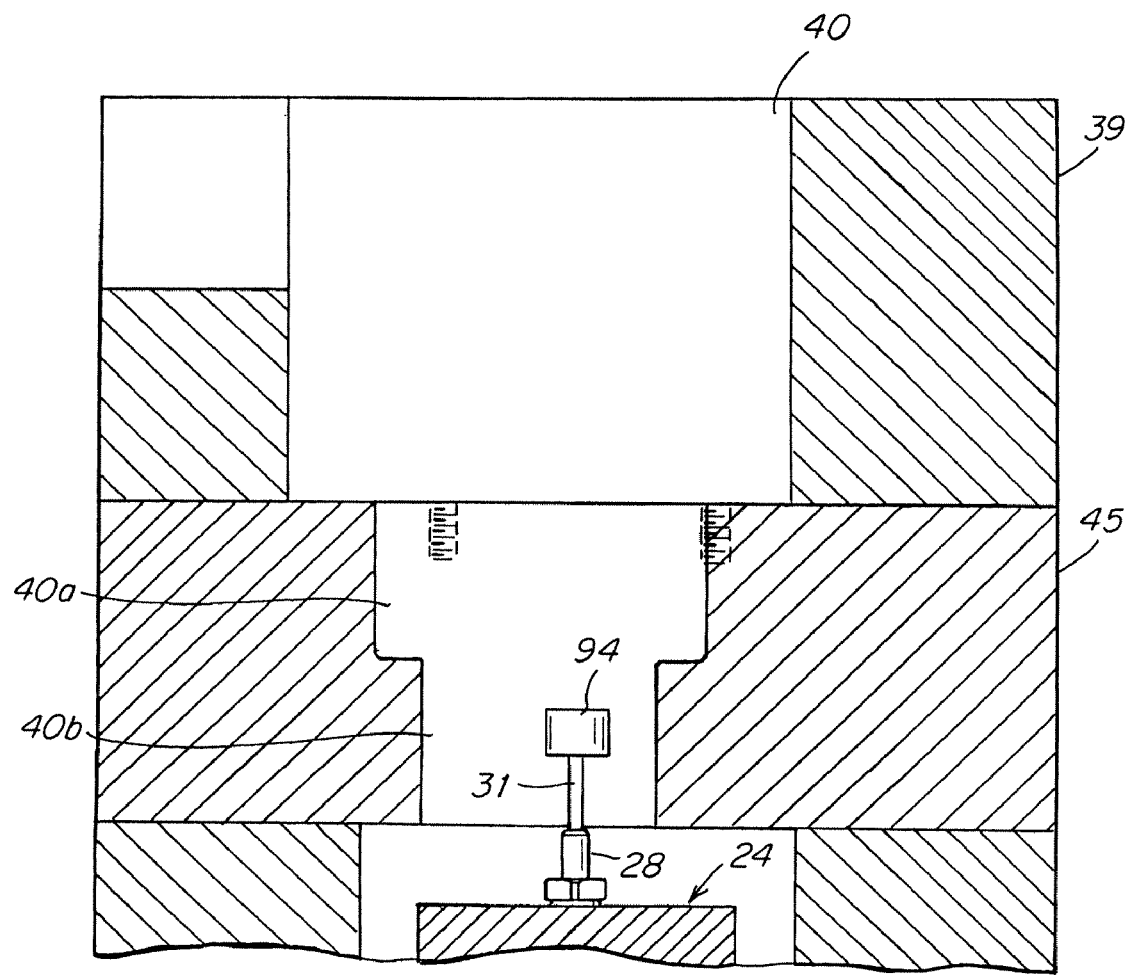

In FIG. 7B the bolts 77 are decoupled from the complementary receiving apertures 50 in the clamp plate 39 thus decoupling the housing 71 from the clamp plate 45. As shown the housing 71 and associated shaft 75 of the actuator are disposed upon decoupling of the housing within the plate receiving apertures 40, 40a, 40b. In FIG. 7C, the first two steps of disassembly have been performed. The bolts have been removed and then the actuator housing 71 is moved laterally or radially in direction S so as to decouple pin connector 94 from coupling 80 by sliding the connector 94 radially 102, (FIG. 7C) out of the recess 82, 83 of the coupling. Upon such decoupling of the connector 94, the pin stem 31 and associated parts such as the pin head 34 and connector 94 and set screw 104 remain behind mounted to the manifold 24 while the actuator 70, is still disposed on the plate 45 and within the recesses 40, 40a, 40b of the mounting plates 39, 45. In a further subsequent operation, the actuator 70 can be removed entirely, FIGS. 7D, 7E, for replacement or repair of the actuator, from the recesses 40, 40a. During this operation the valve pin assembly again remains stationary and behind mounted to the manifold and does not require removal of the pin 30.

Figure 7F:
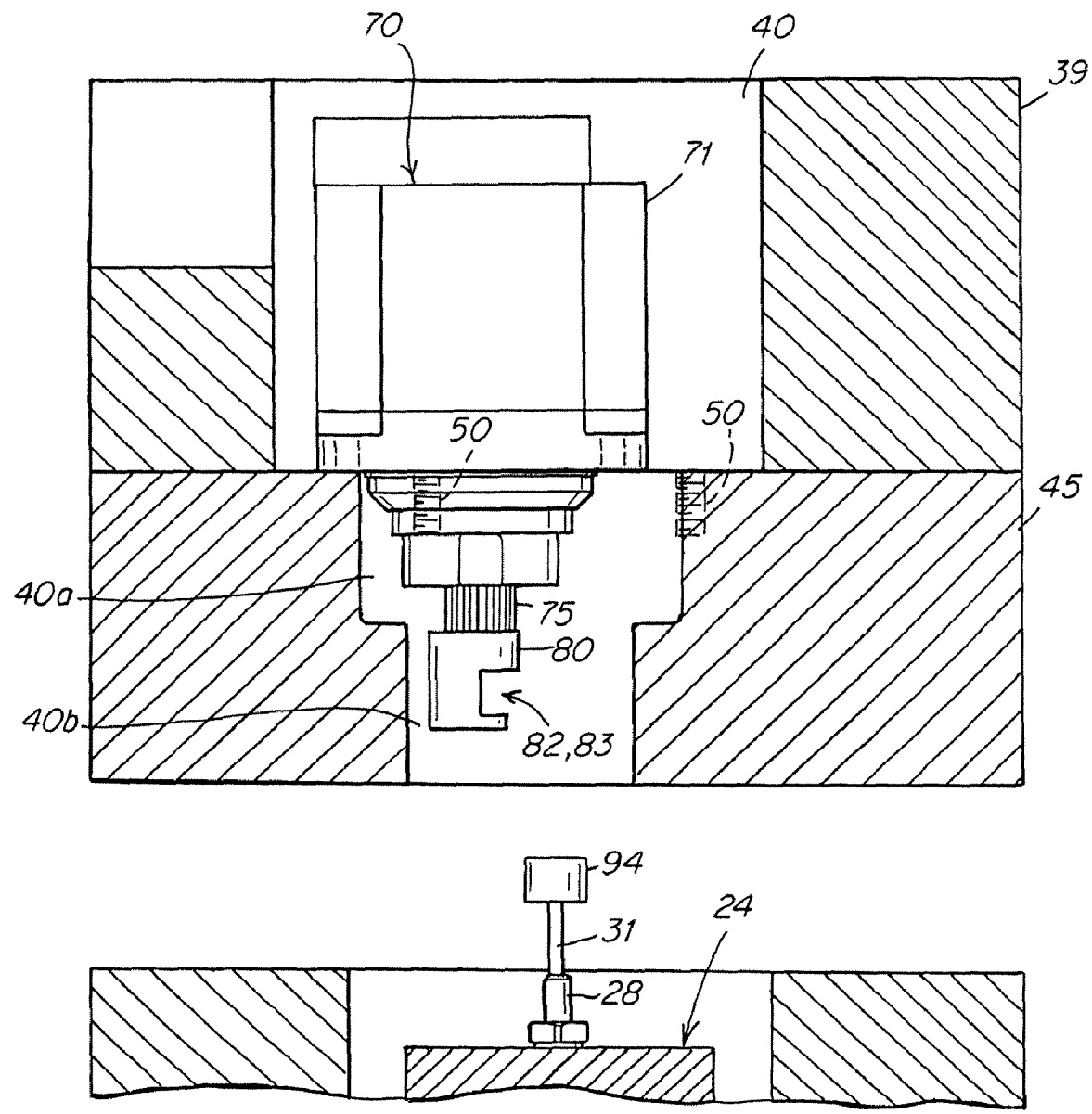

With reference to FIG. 7F, alternatively to removal of only the actuator 70, the mounting plates 39 and/or 45 can also be removed alone or together with the actuator 70 from the mold 12 once the actuator is decoupled from the pin connector 94 without requiring removal of the valve pin 30 (and pin connector 94) from the manifold or nozzle. Thus either the clamp plates 39, 45 can be removed from the system once the pin is decoupled from the actuator coupling 80, or the actuator 70 can removed from the system once the pin is decoupled from the actuator coupling 80, or both the plates and the actuator can be removed from the system once the pin is decoupled from the actuator coupling 80, all such removals being accomplished without removal of the pin 30 from the manifold or nozzle. Where the actuator 70 contains an electrically powered motor, these removal operations can also be accomplished without removing the wiring 78, FIG. 1, connecting the electric motor to the electrical junction box 52 and/or controller 56. The benefit of this alternative is a substantial time savings as the service technician does not have to disconnect the wires from the actuator to the junction box. The service technician can now obtain access to various aspects of the injection molding apparatus, e.g., replacing a thermocouple on the manifold.

Having now described the limited number of embodiments of the present invention it should be apparent to those skilled in the art that numerous embodiments and modifications thereof are contemplated as falling within the scope of the invention as defined by the pending claims.

The invention claimed is:

1. An injection molding system comprising an actuator, a mounting plate, a mold and a manifold mounted between the mounting plate and the mold, the mounting plate being removably assembled with the mold, the actuator comprising an actuating member reciprocally drivable along an axial path of travel and a housing removably assembled with the mounting plate;

a valve pin coupled to a shaft of the actuator for movement of the valve pin together with movement of the actuating member, the valve pin comprising a pin stem and a pin connector;

the actuator having an actuator coupling adapted to reversibly couple to and decouple from the pin connector in a radial direction relative to the axial path of travel, the pin stem extending from the actuator and mounted to the manifold when the housing of the actuator is assembled with the mounting plate and the pin connector is received within the actuator coupling;

the actuator housing being mounted to the mounting plate and movable on or within the mounting plate for radial movement upon disassembly of the actuator housing from the mounting plate such that the pin connector is decouplable from the actuator coupling and the valve stem remains behind extending into the manifold upon said radial movement of the actuator housing on or within the mounting plate.

2. The system of claim 1 wherein the pin connector comprises an adapter removably coupled to a top or upstream end of the stem, the adapter configured to be reversibly receivable within the actuator coupling in a radial direction.

3. The system of claim 2 wherein the pin connector comprises an enlarged head integrally formed with a top or upstream end of the stem and configured to be reversibly receivable within the actuator coupling in a radial direction.

4. The system of claim 1 wherein the system is adapted to allow the pin connector to travel a selected radial distance within the actuator coupling together with radial movement of the pin and the manifold relative to the mounting plate on thermal expansion of the manifold when heated to operating temperature, the pin connector remaining coupled to the coupling and the mounting plate remaining assembled with the mold on said radial movement.

5. The system of claim 1 wherein the pin stem is mounted to the manifold for radial movement of the pin stem together with the manifold relative to the mounting plate.

6. The system of claim 2 wherein the top or upstream end of the stem comprises a pin head formed as an integral part thereof protruding radially from an axis of the stem and the adapter is formed as an enlarged part protruding radially beyond the radial protrusion of the pin head when the adapter is coupled to the pin head.

7. The system of claim 1 wherein the mounting plate is disassemblable from the mold leaving the pin stem extended into the manifold when the pin head is decoupled from the actuator coupling.

8. An injection molding system comprising an actuator, a mounting plate, a mold and a manifold mounted between the mounting plate and the mold, the mounting plate being removably assembled with the mold, the actuator comprising an actuating member reciprocally drivable along an axial path of travel and a housing removably mounted to the mounting plate;

a valve pin coupled to the actuating member for reciprocal axial movement of the valve pin together with movement of the actuating member, the valve pin comprising a pin stem and a pin connector;

the actuator having an actuator coupling interconnected to a downstream end of the actuating member, the actuator coupling being adapted to reversibly couple to and decouple from the pin connector in a radial direction relative to the axial path of travel, the pin stem extending from the actuator and mounted to the manifold when the housing of the actuator is assembled with the mounting plate and the pin head is received within the actuator coupling;

the system being adapted to allow the pin connector, while remaining coupled, to travel within the actuator coupling a radial distance sufficient to accommodate radial movement of the manifold and the pin stem relative to the mounting plate on heating of the manifold to operating temperature while the mounting plate remains assembled with the mold and the actuator housing remains mounted to the mounting plate on said radial movement.

9. The system of claim 8 wherein the actuator housing is mounted on or within the mounting plate for radial movement upon decoupling of the actuator housing from the mounting plate such that the pin connector is decouplable from the actuator coupling upon said radial movement while the actuator housing is disposed on or within the mounting plate, the actuator being removable from on or within the mounting plate leaving the valve stem behind extending into the manifold.

10. The system of claim 8 wherein the pin connector comprises an adapter removably coupled to an upstream end of the stem, the adapter configured to be reversibly receivable within the actuator coupling in a radial direction, the upstream end of the stem comprising a pin head formed as an integral part thereof protruding radially from an axis of the stem and the adapter being formed as an enlarged part protruding radially beyond the radial protrusion of the pin head when the adapter is coupled to the pin head.

11. The system of claim 8 wherein the adapter comprises an enlarged head integrally formed with a top end of the pin stem and configured to be reversibly receivable within the actuator coupling in a radial direction.

12. The system of claim 8 wherein the mounting plate is disassemblable from the mold leaving the pin stem mounted to the manifold when the pin connector is decoupled from the actuator coupling.

13. An injection molding system comprising an actuator, a mounting plate, a mold and a manifold mounted between the mounting plate and the mold, the mounting plate being removably assembled with the mold,
the actuator comprising an electrically driven motor that drives a shaft reciprocally drivable along an axial path of travel and a housing removably mounted to the mounting plate;
a valve pin coupled to the shaft for movement of the valve pin together with movement of the shaft, the valve pin comprising a pin stem and a pin connector;
the shaft having an actuator coupling adapted to reversibly couple to and decouple from the pin connector in a radial direction, the pin stem being mounted to the manifold for radial movement together therewith when the housing of the actuator is mounted to the mounting plate and the pin connector is coupled to the actuator coupling;
the actuator housing being mounted to the mounting plate for radial movement on or within the mounting plate upon disassembly of the actuator housing from the mounting plate such that the pin connector is decouplable from the actuator coupling upon said radial movement while the actuator housing is disposed on or within the mounting plate, the valve stem remaining behind mounted to the manifold upon said radial movement of the actuator housing on or within the mounting plate.

14. The system of claim 13 wherein the system is adapted to allow the pin connector while remaining coupled, to travel within the actuator coupling a radial distance sufficient to accommodate radial movement of the manifold relative to the mounting plate on heating of the manifold to operating temperature while the mounting plate remains assembled with the mold, the actuator housing remains mounted to the mounting plate and the pin stem remains mounted to the manifold.

15. The apparatus of claim 13 wherein the pin connector comprises an adapter removably coupled to the upstream end of the stem, the upstream end of the stem comprising a pin head formed as an integral part thereof protruding radially from an axis of the stem and the adapter is formed as an enlarged part protruding radially beyond the radial protrusion of the pin head when the adapter is coupled to the pin head.

16. The apparatus of claim 13 wherein the pin connector comprises a pin head integrally formed at the upstream end of the pin stem.

17. An injection molding apparatus comprising;
a mounting plate assembled with a mold and a manifold mounted between the mounting plate and the mold:
an electric actuator comprising an electric motor driving a shaft along an axial path of reciprocal travel;
an actuator coupling connected to a downstream end of the shaft;
a valve pin comprising an elongated stem and a pin connector disposed at an upstream end of the stem, the actuator coupling having a recess adapted to readily receive, couple to and decouple from the pin connector in a direction radial to the axial path, the valve pin being drivable along the axial path of travel when the pin connector is coupled to the actuator coupling;
the pin stem extending from the actuator and being mounted to the manifold for radial movement therewith when the mounting plate is assembled with the mold and the pin connector is coupled to the actuator coupling;
the coupling being adapted to allow the pin connector, while coupled, to travel within the recess a radial distance sufficient to accommodate radial movement of the manifold relative to the mounting plate on heating of the manifold to operating temperature while the mounting plate remains assembled with the mold and the pin stem remains mounted to the manifold.

18. The apparatus of claim 17 wherein the actuator comprises an actuator housing removably assembled with the mounting plate, the actuator housing being mounted to the mounting plate for radial movement on or within the mounting plate upon disassembly of the actuator housing from the mounting plate such that the pin connector is decouplable from the actuator coupling upon said radial movement while the actuator housing is disposed on or within the mounting plate, the valve stem remaining behind mounted to the manifold upon said radial movement of the actuator housing on or within the mounting plate.

19. The apparatus of claim 17 wherein the pin connector comprises an adapter removably coupled to the upstream end of the stem.

20. The apparatus of claim 17 wherein the pin connector comprises a pin head integrally formed at the upstream end of the stem.

21. The apparatus of claim 19 wherein the pin head is formed as an integral part of the upstream end of the pin stem protruding radially from an axis of the stem and the adapter is formed as an enlarged part protruding radially beyond the radial protrusion of the pin head when the adapter is attached to the pin head.

22. The apparatus of claim 18 wherein the pin extends from the actuator coupling into the manifold when the pin connector is coupled to the actuator coupling and, when the actuator is decoupled from the mounting plate, the actuator is movable radially relative to the axis of the pin on or within the mounting plate a distance sufficient to decouple the pin connector from the actuator coupling without decoupling the mounting plate from the mold.

23. An injection molding apparatus comprising;
a mounting plate assembled with a mold and a manifold mounted between the mounting plate and the mold:
an actuator removably assembled with and mounted to the mounting plate, the actuator comprising an actuating member drivable along an axial path of reciprocal travel;
an actuator coupling interconnected to a downstream end of the actuating member;
a valve pin having an elongated stem defining a pin axis and a pin connector having a selected configuration mounted at an upstream end of the stem, the stem being mounted to the manifold and radially movable together with the manifold relative to the mounting plate on thermal expansion of the manifold when heated to operating temperature;

the actuator coupling forming a recess complementary in configuration to the configuration of the pin connector, the complementary configuration of the recess being adapted to reversibly receive the pin connector in a direction transverse or radial to the axial path of travel of the actuating member, the recess being adapted to allow the pin connector to travel radially within the recess a distance sufficient to accommodate radial movement of the stem together with the manifold while the pin connector remains coupled within the recess such that the valve pin is reciprocally drivable along the axial path of reciprocal travel of the actuating member.

24. The apparatus of claim 23 wherein the actuator coupling comprises a housing interconnected to the downstream end of the actuating member, the housing having walls enclosing and forming the recess in a configuration that requires insertion and removal of the pin connector in a direction radial to the axial path of travel of the shaft.

25. The apparatus of claim 23 wherein the pin connector comprises an adapter removably coupled to the upstream end of the stem.

26. The apparatus of claim 23 wherein the pin connector comprises a pin head integrally formed at the upstream end of the stem.

27. The apparatus of claim 25 wherein the pin head is formed as an integral part of the upstream end of the pin stem protruding radially from an axis of the stem and the adapter is formed as an enlarged part protruding radially beyond the radial protrusion of the pin head when the adapter is attached to the pin head.

28. The apparatus of claim 23 wherein the pin extends from the actuator coupling into the manifold when the pin connector is coupled to the actuator coupling and, when the actuator is disassembled from the mounting plate, the actuator is movable radially relative to the axis of the pin on or within the mounting plate a distance sufficient to decouple the pin connector from the actuator coupling without disassembling the mounting plate from the mold.

* * * * *